(12) United States Patent
Popp et al.

(10) Patent No.: US 11,958,146 B2
(45) Date of Patent: Apr. 16, 2024

(54) BOLT AND FASTENING ARRANGEMENT

(71) Applicant: HILTI AKTIENGESELLSCHAFT, Schaan (LI)

(72) Inventors: Uwe Popp, Widnau (CH); Simon Stahel, Chur (CH); Klaus Bertsch, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 1030 days.

(21) Appl. No.: 16/652,561

(22) PCT Filed: Oct. 4, 2018

(86) PCT No.: PCT/EP2018/076992
§ 371 (c)(1),
(2) Date: Mar. 31, 2020

(87) PCT Pub. No.: WO2019/072676
PCT Pub. Date: Apr. 18, 2019

(65) Prior Publication Data
US 2020/0238425 A1 Jul. 30, 2020

(30) Foreign Application Priority Data
Oct. 9, 2017 (EP) .................................. 17195421

(51) Int. Cl.
*F16B 37/06* (2006.01)
*B23K 9/20* (2006.01)
(Continued)

(52) U.S. Cl.
CPC .......... *B23K 9/202* (2013.01); *B23K 35/0288* (2013.01); *B23K 9/207* (2013.01);
(Continued)

(58) Field of Classification Search
CPC ...... F16B 33/004; F16B 37/06; F16B 37/061; F16B 43/00; F16B 43/001; F16J 15/02;
(Continued)

(56) References Cited

U.S. PATENT DOCUMENTS 3,149,850 A * 9/1964 Fischer ................. F16B 5/0266
277/648
3,399,589 A * 9/1968 Breed ................... F16B 33/004
411/428
(Continued)

FOREIGN PATENT DOCUMENTS

CN 101684832 A 3/2010
CN 102345665 A 2/2012
(Continued)

OTHER PUBLICATIONS

International Bureau, International Search Report in International Application No. PCT/EP2018/076992, dated Dec. 3, 2018.

*Primary Examiner* — Roberta S Delisle
(74) *Attorney, Agent, or Firm* — Leydig, Voit & Mayer, Ltd.

(57) ABSTRACT

A stud for fastening an attachment element to an underlying surface is provided, having a shank that defines a fastening direction, having a sealing element for sealing off a contact zone between the shank and the underlying surface, and having a force transmission element for transmitting compressive forces from the attachment element to the underlying surface.

20 Claims, 2 Drawing Sheets

(51) Int. Cl.
*B23K 35/02* (2006.01)
*F16B 43/00* (2006.01)
*F16J 15/02* (2006.01)

(52) U.S. Cl.
CPC ............. *F16B 37/06* (2013.01); *F16B 37/061* (2013.01); *F16B 43/001* (2013.01); *F16J 15/02* (2013.01)

(58) Field of Classification Search
CPC .... B23K 9/202; B23K 9/207; B23K 35/0288; Y10S 411/915
USPC ....................... 411/371.1, 531, 542
See application file for complete search history.

(56) References Cited

U.S. PATENT DOCUMENTS

| | | | | |
|---|---|---|---|---|
| 3,435,871 A * | 4/1969 | Johnson | ................. | B23K 11/14 411/965 |
| 3,606,357 A * | 9/1971 | Yonkers | ................. | F16B 43/001 277/637 |
| 4,915,561 A | 4/1990 | Buhri et al. | | |
| 5,188,495 A | 2/1993 | Jones | | |
| 5,865,583 A * | 2/1999 | Krawczak | ............. | F16B 33/004 411/533 |
| 7,597,518 B1 * | 10/2009 | Curtis | ................... | F16B 35/048 411/371.1 |
| 7,645,105 B2 * | 1/2010 | Hengel | ............. | B23K 11/0053 24/270 |
| 8,418,812 B1 * | 4/2013 | Rosen | ................... | F01M 11/04 411/371.1 |
| 8,931,989 B2 * | 1/2015 | Stephan | .................. | F16J 15/14 411/371.1 |
| 9,322,427 B2 | 4/2016 | Thau et al. | | |
| 9,488,207 B2 | 11/2016 | Lor et al. | | |
| 2004/0105735 A1 * | 6/2004 | Favre-Bulle | ............ | F16B 37/06 411/147 |
| 2010/0047033 A1 | 2/2010 | Baumgartner et al. | | |
| 2010/0119772 A1 | 5/2010 | Christ et al. | | |
| 2012/0027538 A1 | 2/2012 | Thau et al. | | |
| 2014/0314521 A1 | 10/2014 | Lor et al. | | |
| 2015/0023764 A1 | 1/2015 | Lauer et al. | | |
| 2017/0157696 A1 * | 6/2017 | Kurzmaier | ............ | F16B 37/061 |

FOREIGN PATENT DOCUMENTS

| | | |
|---|---|---|
| CN | 103917324 A | 7/2014 |
| CN | 103975167 A | 8/2014 |
| CN | 104741746 A | 7/2015 |
| EP | 0 321 396 A2 | 6/1989 |
| EP | 0557688 A1 | 9/1993 |
| EP | 2412992 A1 | 2/2012 |
| JP | H6-42324 A | 2/1994 |
| SU | 350232 F3 | 9/1972 |
| SU | 1692784 A1 | 11/1991 |
| WO | WO 2013/045130 A1 | 4/2013 |

* cited by examiner

BOLT AND FASTENING ARRANGEMENT

CROSS-REFERENCE TO RELATED APPLICATIONS

This patent application is the U.S. National Stage of International Patent Application No. PCT/EP2018/076992, filed Oct. 4, 2018, which claims the benefit of European Patent Application No. 17195421.7, filed Oct. 9, 2017, which are each incorporated by reference.

FIELD OF THE INVENTION

The invention relates generally to an apparatus and to a method for fastening a stud to an underlying surface, and to such a stud.

BACKGROUND OF THE INVENTION

Numerous apparatuses and methods are known, by which various studs are fastened to an underlying surface in different applications. For example, a stud is brought into contact with the underlying surface and an electric current is applied to it. As soon as the electric current flows between the stud and the underlying surface, the stud is lifted off the underlying surface, with an arc being formed. The energy that is released causes the material of the stud and the underlying surface to be partially liquefied. The electric current is then switched off and the stud is immersed in the liquefied material while this material cools down and becomes solid. The stud is then connected to the underlying surface in a materially bonded manner.

In order to provide the necessary energy for liquefying the material of the stud and of the underlying surface in a sufficiently short time, apparatuses are known that generate an electric current with a very high intensity and feed it to the stud via a correspondingly rated electric cable. To avoid oxidization of the liquefied material, it is known to surround the contact point between the stud and the underlying surface with an inert gas.

In applications in building construction or shipbuilding for example, use is made of threaded studs of various sizes, to which an item is screwed in order to fasten the item to the underlying surface. Some parameters of the fastening method, for example the duration and electrical power of the electric current, need to be set on the apparatus by a user and to be adapted to the stud that is used. Finally, the user assesses the quality of the connection between the stud and the underlying surface by means of a visual inspection. Therefore, the quality of the connection also depends on the experience and capabilities of the user.

In the case of studs that have a sealing ring, care should be taken to ensure that the sealing ring has been sufficiently pressed following fastening, in order to achieve a sufficient sealing effect. Otherwise, the sealing should not be excessively compressed, in order not to be excessively deformed.

BRIEF SUMMARY OF THE INVENTION

The object of the invention is to provide an apparatus and/or a method with which fastening of a stud to an underlying surface is improved. In particular, a region of the fastening is intended to be sealed off reliably.

This object is achieved in the case of a stud for fastening an attachment element to an underlying surface, having a shank that defines a fastening direction, having a sealing element for sealing off a contact zone between the shank and the underlying surface, and having a force transmission element for transmitting compressive forces from the attachment element to the underlying surface. Under certain circumstances, the force transmission element transmits an attachment force and/or a lateral force perpendicularly to the fastening direction and/or a bending moment about an axis perpendicular to the fastening direction and/or a torque about an axis parallel to the fastening direction of the attachment element to the underlying surface, such that the sealing element is not subjected to the particular force or the particular moment/torque. The sealing element is made preferably of an elastic material such as an elastomer, for example rubber or EPDM. The force transmission element is made preferably of a rigid material such as a metal, an alloy, ceramic or the like.

One advantageous embodiment is characterized in that the force transmission element has a bearing surface for the attachment element to bear on the force transmission element and a supporting surface for supporting the force transmission element on the underlying surface. Preferably, a distance between the bearing surface and the supporting surface in the fastening direction is the same as or greater than a length of the sealing element in the fastening direction.

Likewise preferably, the force transmission element has a contact pressure surface for the sealing element to press against the underlying surface. Particularly preferably, a distance between the contact pressure surface and the supporting surface in the fastening direction is less than a length of the sealing element in the fastening direction. A ratio of the distance between the contact pressure surface and the supporting surface to the length of the sealing element is preferably between 50% and 90%.

One advantageous embodiment is characterized in that a cross-sectional area of the sealing element perpendicularly to the fastening direction decreases in the fastening direction. As a result, the sealing area between the sealing element and the underlying surface increases with increasing contact pressure force with which the sealing element is pressed against the underlying surface.

One advantageous embodiment is characterized in that the stud is a welding stud, a setting stud or a bolt.

One advantageous embodiment is characterized in that the sealing element is configured in an annular manner, wherein the sealing element bears internally against the shank and/or bears externally against the force transmission element.

One advantageous embodiment is characterized in that the force transmission element is configured in an annular manner.

One advantageous embodiment is characterized in that the sealing element and/or the force transmission element is circular.

One advantageous embodiment is characterized in that the stud has a thread for tightly screwing the attachment element on the stud.

One advantageous embodiment is characterized in that the stud is inserted into a fastening arrangement having an underlying surface and an attachment element. Preferably, the force transmission element is clamped in place between the attachment element and the underlying surface.

BRIEF DESCRIPTION OF THE SEVERAL VIEWS OF THE DRAWING(S)

The invention is explained in more detail in the following text by way of exemplary embodiments with reference to the drawings, in which:

FIG. 1 schematically shows a welding apparatus,

DETAILED DESCRIPTION OF THE INVENTION

Figure 1:
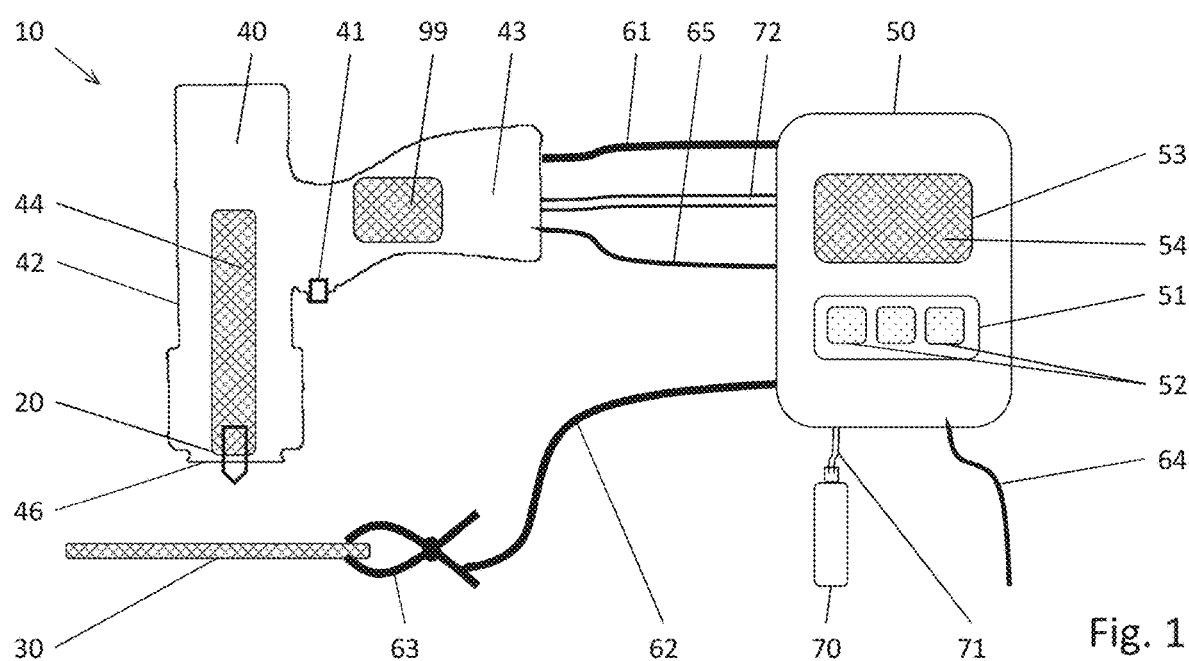

FIG. 1 schematically illustrates a welding apparatus 10 for welding a welding stud 20 to an underlying surface 30. A material of the welding stud 20 and a material of the underlying surface 30 are electrically conductive, in particular metallic. The welding apparatus 10 comprises a welding gun 40 having a trigger switch 41 in the form of a pushbutton switch, a welding unit 50, a first electric cable 61, a second electric cable 62 having a connection terminal 63, an electric supply cable 64 in the form of a power cable, for example, an electric communication line 65, a gas reservoir 70 in the form of a gas cylinder, a tubular gas supply line 71, and a gas hose 72.

The first cable 61 serves for supplying the welding stud 20 with electric current through the welding unit 50. The second cable 62 serves for electrically connecting the underlying surface 30 to the welding unit 50 when the connection terminal 63 is clamped to the underlying surface 30. When the welding stud 20 comes into contact with the underlying surface 30, a circuit closes, such that welding current, for example in the form of direct current or alternating current, is able to be applied to the welding stud 20 by the welding unit 50. For this purpose, the welding gun 40 comprises a welding-current contact element (not shown in FIG. 1). The welding unit 50 comprises a device (not shown) for converting electric current from the supply cable 64 into welding current, which comprises for example an electrical capacitor, a thyristor, a bipolar transistor with an isolated gate electrode or other components from power electronics, and an associated control unit with a microprocessor, in order to provide the welding current at the desired voltage and intensity.

The gas supply line 71 and the gas hose 72 serve for supplying a contact region between the welding stud 20 and the underlying surface 30 with an inert gas from the gas reservoir 70, in order to protect the contact region from oxidation due to oxygen from a surrounding area during a welding operation. For controlling a gas flow to the contact region, the gas reservoir 70, the gas supply line 71, the welding unit 50, the gas hose 72 or the welding gun 40 comprises a valve (not shown), in particular a controllable valve.

The welding unit 50 has an input device 51 having actuating elements 52, and an output device 53 having a visual display element 54 and a wireless transmission unit. The input device 51 serves for the input of parameters of a welding method to be carried out with the welding apparatus 10, for example the voltage, current intensity, power and time duration of the welding current, position and speed of the stud and so on, by a user of the welding apparatus 10. The output device 53 serves to output information to the user, for example information about parameters of the welding method, information about detected emissions of the welding method or other variables, information about a quality of the welding operation, information about measures for improving the welding operation, information about detected properties of the welding stud, or information derived from the aforementioned variables, and/or recommendations or instructions for cleaning and/or maintaining the welding apparatus 10, in particular the welding gun 40.

The communication line 65 serves for communication between the welding gun 40, in particular a control device (not shown in FIG. 1) of the welding gun 40, and the welding unit 50, in particular the control unit and/or the input device 51 and/or the output device 53. By way of this communication, for example an exchange of information about the parameters of a welding operation is accomplished, in order for example to achieve synchronization of the welding current with a movement of the welding stud 20 or to make this easier. In exemplary embodiments that are not shown, the communication between the welding gun and the welding unit takes place wirelessly, by radio or by means of the first electric cable, which carries the welding current.

The welding gun 40 has a housing 42 with an opening 46, a handle 43 having the trigger switch 41 protruding from said housing 42. The welding gun 40 also has a stud holder 44, on which the welding stud 20 is held during a welding operation. For this purpose, the stud holder comprises for example two, three, four or more resilient arms (not shown in detail), between which the welding stud 20 is inserted and held by means of a clamping fit. The welding gun 40 also has a welding-current contact element for applying a welding current to the welding stud 20, said welding-current contact element being integrated into the stud holder 44, for example in the form of one or more of the resilient arms.

The welding gun 40 also has a control device 99 for controlling the various components and devices of the welding gun and of the welding unit 50. The control device 99 is provided for controlling one or more parameters of the welding operation. For this purpose, the control device 99 comprises various electronic components, for example one or more microprocessors, one or more temporary or permanent data memories, and the like.

The welding gun 40 also has a stud lifting device in the form of a first lifting magnet, which subjects the stud holder 44 to a force rearwardly away from the opening 46 (upwardly in FIG. 1) when the stud lifting device is activated. Via a signal line (not shown), the control device 99 communicates with the stud lifting device in order to control the stud lifting device, in particular to activate and deactivate the latter.

The welding gun 40 also has a stud immersing device in the form of a spring element or of a second lifting magnet, which subjects the stud holder 44 to a force forwardly toward the opening 46 (downwardly in FIG. 1) when the stud immersing device is activated. Via a signal line (not shown), the control device 99 communicates with the stud immersing device in order to control the stud immersing device, in particular to activate and deactivate the latter. If the stud immersing device is in the form of a spring element, this spring element is preferably tensioned when the stud holder is moved rearwardly by the stud lifting device, such that the spring element moves the stud holder forward as soon as the stud lifting device is deactivated.

In a welding process using the welding apparatus 10, first of all the underlying surface 30 and the stud 20 are provided. In a further step, information, for example about desired parameters of the following welding operation, is input by a user via the input device. In a further step, a welding current between the welding stud 20 and the underlying surface 30 is applied to the welding stud 20 by the welding unit 50 by means of the first cable 61 and the second cable 62. In a further step, the welding stud 20 is lifted off the underlying surface by means of the stud lifting device, with the flow of the welding current being maintained between the welding stud 20 and the underlying surface 30, wherein an arc is formed between the welding stud 20 and the underlying surface 30. In particular on account of the heat generated by the arc, a material of the welding stud 20 and/or of the underlying surface 30 is then partially liquefied. In a further step, the welding stud 20 is immersed in the liquefied material of the welding stud 20 or of the underlying surface 30 by means of the stud immersing device. The liquefied material of the welding stud 20 or of the underlying surface 30 then solidifies such that the welding stud 20 is connected to the underlying surface 30 in a materially bonded manner.

Figure 2:
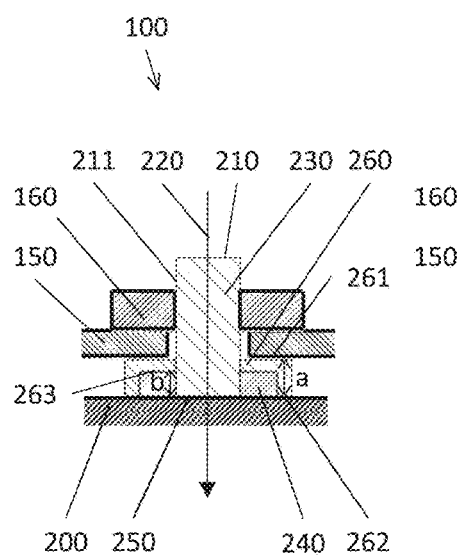
FIG. 2 shows a welding stud in a longitudinal sectional view.

FIG. 2 illustrates a longitudinal section through a fastening arrangement 100 having an attachment element 150, an underlying surface 200, and a stud 210 for fastening the attachment element 150 to the underlying surface 200. The stud 210 has a shank 230 that defines a fastening direction 220, a sealing element 240 for sealing off a contact zone 250 between the shank and the underlying surface, and a force transmission element 260 for transmitting compressive forces from the attachment element 150 to the underlying surface 200. The sealing element 240, which is in the form of a circular ring, bears internally against the shank 230 and externally against the force transmission element 260, which is likewise in the form of a circular ring.

The stud 210 is configured for example as a welding stud, a setting stud or a bolt, wherein the contact zone 250 is then in the form of a weld seam or joining gap or some other joint, and is provided with a thread 211. A holding element 160 in the form of a nut is fastened to the stud 210, in the present example screwed onto the thread 211, in order to secure the attachment element 150 to the stud 210 and thus to the underlying surface 200.

The force transmission element 260 has a bearing surface 261 for the attachment element 150 to bear on the force transmission element 260, and a supporting surface 262 for supporting the force transmission element 260 on the underlying surface. A distance a between the bearing surface 261 and the supporting surface 262 in the fastening direction 220 is the same as a length of the sealing element 240 in the fastening direction 220. As a result, the force transmission element 260 transmits an attachment force from the attachment element to the underlying surface without applying the entire attachment force to the sealing element. The force transmission element 260 is then clamped in place between the attachment element 150 and the underlying surface 200.

The force transmission element 260 transmits only a contact pressure force to the sealing element 240, in order to press the sealing element 240 against the underlying surface 200. For this purpose, the force transmission element 260 has a contact pressure surface 263, the distance b of which from the supporting surface 262 in the fastening direction 220 is less than a length of the sealing element 240 in the fastening direction 220 when the sealing element 240 is relaxed. A ratio of the distance b to the length of the relaxed sealing element is for example 75%. The sealing element 240 is then accordingly compressed, in order to deploy its sealing effect. The sealing effect is independent of the attachment force, i.e. also independent of a force with which the holding element 160 is fastened to the stud 210.

Figure 3:
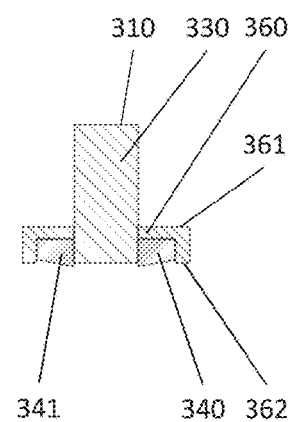
FIG. 3 shows a welding stud in a longitudinal sectional view.

FIG. 3 illustrates a longitudinal section through a stud 310 for fastening an attachment element (not shown) to an underlying surface (not shown). The stud 310 has a shank 330 that defines a fastening direction, a sealing element 340 for sealing off a contact zone between the shank 330 and the underlying surface, and a force transmission element 360 for transmitting compressive forces from the attachment element to the underlying surface. The sealing element 340, which is in the form of a circular ring, bears internally against the shank 330 and externally against the force transmission element 360, which is likewise in the form of a circular ring.

The force transmission element 360 has a bearing surface 361 for the attachment element to bear on the force transmission element 360, and a supporting surface 362 for supporting the force transmission element 360 on the underlying surface. An end face 341, directed in the fastening direction, of the sealing element 340 is beveled, such that a cross-sectional area of the sealing element 340 perpendicularly to the fastening direction decreases in the fastening direction. As a result, the sealing area between the sealing element 340 and the underlying surface increases with increasing contact pressure force with which the sealing element 340 is pressed against the underlying surface.

Figure 4:
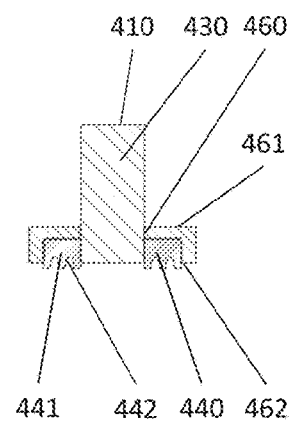
FIG. 4 shows a welding stud in a longitudinal sectional view.

FIG. 4 illustrates a longitudinal section through a stud 410 for fastening an attachment element (not shown) to an underlying surface (not shown). The stud 410 has a shank 430 that defines a fastening direction, a sealing element 440 for sealing off a contact zone between the shank 430 and the underlying surface, and a force transmission element 460 for transmitting compressive forces from the attachment element to the underlying surface. The sealing element 440, which is in the form of a circular ring, bears internally against the shank 430 and externally against the force transmission element 460, which is likewise in the form of a circular ring.

The force transmission element 460 has a bearing surface 461 for the attachment element to bear on the force transmission element 460, and a supporting surface 462 for supporting the force transmission element 460 on the underlying surface. An end face 441, directed in the fastening direction, of the sealing element 440 has two encircling recesses 4432, in particular grooves, such that a cross-sectional area of the sealing element 440 perpendicularly to the fastening direction decreases in the fastening direction. As a result, the sealing area between the sealing element 440 and the underlying surface increases with increasing contact pressure force with which the sealing element 440 is pressed against the underlying surface.

The sealing element is produced preferably by being cut out of sheet material, stamped, injection-molded or by similar processes. In particular in the case of injection-molding, specific shaping is advantageous, by which a surface pressure of the sealing element is locally increased and/or a development of the surface pressure along a contact pressure path is set such that the sealing function is ensured even in the case of a changing contact pressure path.

In order to avoid damage to an underlying-surface coating that may be present, in an exemplary embodiment that is not shown, a radially outer region of the sealing element projects between the force transmission element and the underlying surface. In further exemplary embodiments that are not shown, the sealing element and the force transmission element are manufactured in one piece from the same material. For example, by suitable shaping (in particular with grooves as shown in FIG. 4), a behavior that is initially elastic along the contact pressure path and subsequently much greater stiffness are achieved.

The invention has been described on the basis of examples of an apparatus for fastening a first item to a second item and a production method for such an apparatus. The features of the described embodiments can also be combined with one another as desired within a single fastening apparatus or a single production method. It should be noted that the apparatus according to the invention and the method according to the invention are also suitable for other purposes.

The invention claimed is:

1. A stud for fastening an attachment element to an underlying surface, the stud having a shank that defines a fastening direction; a sealing element for sealing off a contact zone between the shank and the underlying surface; and, a force transmission element for transmitting compressive forces from the attachment element to the underlying surface, wherein the force transmission element has a bearing surface for the attachment element to bear on the force transmission element and a supporting surface for supporting the force transmission element on the underlying surface.

2. The stud as claimed in claim 1, wherein a distance between the bearing surface and the supporting surface in the fastening direction is the same as or greater than a length of the sealing element in the fastening direction.

3. The stud as claimed in claim 2, wherein the stud is a welding stud, a setting stud or a bolt.

4. The stud as claimed in claim 2, wherein the force transmission element is configured in an annular manner.

5. The stud as claimed in claim 2, wherein the stud has a thread for tightly screwing the attachment element on the stud.

6. The stud as claimed in claim 1, wherein the force transmission element has a contact pressure surface for the sealing element to press against the underlying surface.

7. The stud as claimed in claim 6, wherein a distance between the contact pressure surface and the supporting surface in the fastening direction is less than a length of the sealing element in the fastening direction.

8. The stud as claimed in claim 7, wherein a ratio of the distance between the contact pressure surface and the supporting surface to the length of the sealing element is between 50% and 90%.

9. The stud as claimed in claim 8, wherein a cross-sectional area of the sealing element perpendicularly to the fastening direction decreases in the fastening direction.

10. The stud as claimed in claim 7, wherein a cross-sectional area of the sealing element perpendicularly to the fastening direction decreases in the fastening direction.

11. The stud as claimed in claim 1, wherein the stud is a welding stud, a setting stud or a bolt.

12. The stud as claimed in claim 1, wherein the sealing element is configured in an annular manner, and wherein the sealing element bears internally against the shank and bears externally against the force transmission element.

13. The stud as claimed in claim 1, wherein the force transmission element is configured in an annular manner.

14. The stud as claimed in claim 1, wherein the sealing element and the force transmission element is circular.

15. The stud as claimed in claim 1, wherein the stud has a thread for tightly screwing the attachment element on the stud.

16. The stud as claimed in claim 1, wherein the sealing element is configured in an annular manner, and wherein the sealing element bears internally against the shank or bears externally against the force transmission element.

17. The stud as claimed in claim 1, wherein the sealing element or the force transmission element is circular.

18. The stud as claimed in claim 1, wherein the force transmission element abuts the underlying surface to transmit the compressive forces from the attachment element to the underlying surface.

19. A fastening arrangement having an underlying surface, a stud, and an attachment element, wherein the stud is configured for fastening the attachment element to the underlying surface, the stud having a shank that defines a fastening direction; a sealing element for sealing off a contact zone between the shank and the underlying surface; and, a force transmission element for transmitting compressive forces from the attachment element to the underlying surface, wherein the force transmission element has a bearing surface for the attachment element to bear on the force transmission element and a supporting surface for supporting the force transmission element on the underlying surface.

20. The fastening arrangement as claimed in claim 19, wherein the force transmission element is clamped in place between the attachment element and the underlying surface.

* * * * *